March 15, 1955 JACQUES I. PANTCHECHNIKOFF 2,703,917
NOW BY CHANGE OF NAME
JACQUES ISAAC PANKOVE
MANUFACTURE OF TRANSISTORS
Filed March 29, 1952

INVENTOR
Jacques I. Pantchechnikoff
BY H. L. Muston
ATTORNEY

United States Patent Office 2,703,917

Patented Mar. 15, 1955

2,703,917

MANUFACTURE OF TRANSISTORS

Jacques I. Pantchechnikoff, now by change of name Jacques Isaac Pankove, Princeton, N. J., assignor to Radio Corporation of America, a corporation of Delaware Application March 29, 1952, Serial No. 279,315

2 Claims. (Cl. 29—25.3)

This invention relates to transistors and a method for manufacturing transistors.

In the U. S. Patent 2,561,109 to L. J. Giacoletto there has been disclosed and claimed a semi-conductor device or transistor adapted particularly for mass production techniques. The above transistor was developed with the view of facilitating the predetermined spacing between the emitter and collector electrodes of the transistor.

The transistor of the present invention likewise has a minimum of parts and does not require complicated means for mounting and securing the electrodes.

It is accordingly an object of the present invention to provide an improved semi-conductor device or transistor which is mechanically simplified and is very stable in operation and a novel process of manufacturing such a transistor.

A further object of the invention is to provide a novel process of preparing the emitter and collector electrodes of the transistor and positioning them on a semi-conductor crystal.

Another object of the invention is to provide an improved process of manufacturing transistors with a minimum of parts adapted for large scale production.

A transistor in accordance with the present invention includes a semi-conducting crystal having two surfaces which extend preferably in a plane and are disposed parallel to each other. One of the surfaces is secured to a large wire which supports the crystal and serves as a base electrode. The emitter and collector electrodes preferably consist of a single piece of wire which includes an open loop forming the intermediate portion of the wire and two substantially straight leg portions which extend toward the center of the loop.

The loop may be secured to the heavy wire forming the base electrode, for example, by welding. The free ends of the straight leg portions are then brought into contact with the upper surface of the crystal to provide the emitter and collector electrodes. The crystal with its electrodes is now embedded in a suitable insulating material and the loop is severed so that separate connections can be made to the emitter and collector electrodes. The insulating material in which the crystal is embedded forms the sole support for the emitter and collector electrodes.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
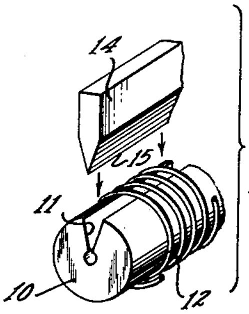
Figure 1 is a view in perspective of a mandrel about which a wire is wound in the form of a spiral.

Referring now to the drawing in which like elements are designated by the same reference numerals throughout the figures, and particularly to Figure 1, there is illustrated a mandrel 10 which is utilized for preparing wire loops which may subsequently form the emitter and collector electrodes of the transistor of the invention. The mandrel 10 is of cylindrical shape and is provided with a wedge shaped recess 11 having straight sides as clearly shown in Figure 1. The bottom of the recess 11 may be round as shown or square. A single wire 12 is wound spirally about the mandrel 10. The wire 12 may, for example, consist of phosphor bronze and may, for example, have a diameter of 10 mils or less.

Figure 2:
Figure 2 is a side elevational view of a single wire loop adapted to form the emitter and collector electrodes of a transistor.

In order to prepare the wire loops which, in turn, provide the emitter and collector electrodes, the spiral wire 12 is severed into individual loops, each consisting substantially of a single turn of the wire. To this end, a wedge 14 having a knife edge 15 is inserted into the recess 11. Consequently, each full turn of the wire 12 is cut or severed and the free ends of the wire are pressed against the straight sides of the recess 11. The bottom of the recess 11 should be so deep that the knife edge 15 cannot touch it. The resulting wire structure 16 is illustrated in Figure 2. The wire structure 16 includes an intermediate portion 17 forming an open loop and two substantially straight leg portions 20 and 21 which are of substantially equal length and which extend toward the center of the loop 17.

Figure 3:
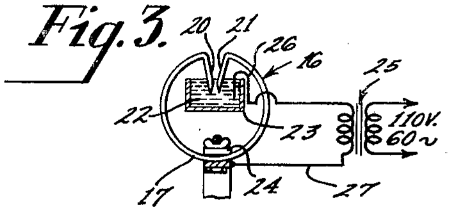
Figure 3 is a schematic view of the wire loop immersed in an electrolytic bath for pointing the ends of the loop.

The wire structure 16 may be utilized in the form illustrated in Figure 2. Preferably, however, the free ends or tips of the wire 16 are shaped or pointed. This may, for example, be effected by an electrolytic process illustrated diagrammatically in Figure 3. The etching solution 22 is contained in an insulating container 23 and may consist, for example, of 85% phosphoric acid and 15% sulphuric acid. By means of a clamp 24 the wire 16 is supported in such a manner that the free ends or leg portions 20, 21 are immersed in the etching solution 22.

An alternating current which may be the 110 volts–60 cycle house current is impressed on the primary of the transformer 25. One terminal of the transformer secondary is connected to the etching solution 22 through lead 26 while lead 27 makes contact with the clamp 24 which, in turn, is electrically connected to the wire 16. When electrical energy is applied to the transformer 25, a portion of the tips of the wire 16 is removed and consequently, the tips are pointed to a suitable shape.

Figure 4:
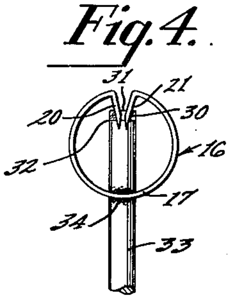
Figures 4–7 are side elevational views showing successive steps in the assembly or manufacture of the transistor of the invention.

The wire 16 is now ready to be used in a transistor. The successive steps of the manufacture are illustrated in Figures 4–7. As shown in Figure 4 a semi-conducting crystal 30 is preferably provided with two plane surfaces 31, 32, which are preferably disposed parallel to each other. The surface 32 of the crystal 30 is now soldered or otherwise fixed to a heavy support wire 33 which may, for example, consist of nickel or copper. The crystal 30 may, for example, have the shape of a block with the dimensions 40 x 40 x 20 mils. The support wire 33 preferably has a diameter of 40 mils so that the diameter of the support wire 33 approximately equals the side of surface 32. The support wire 33 should be in low-resistance contact with the crystal 30 to provide a base electrode.

The intermediate loop 17 of the wire 16 is now welded or otherwise secured as at 34 to the support wire 33. The wire loop 17 is positioned with respect to support wire 33 in such a manner that the free ends 20 and 21 are below the upper surface 31 of the crystal 30.

Figure 5:
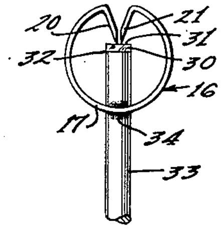

As shown in Figure 5, the free ends 20, 21 of the wire 16 are now lifted so as to be in contact with the upper surface 31 of the crystal 30. The free ends 20, 21 are so positioned that they have a predetermined distance from each other which may be of the order of a few mils, but may be as large as 20 mils. This may be effected with a suitable spacing tool. The wire loop 17 is secured to the support wire 33 in such a manner that a predetermined contact pressure is provided between the crystal 30 and the free ends of the wire 16.

Figure 6:
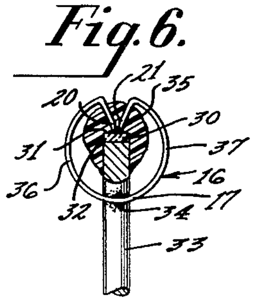

As illustrated in Figure 6, the crystal 30, support wire 33 and the free ends 20, 21 of the wire 16 are now embedded in a suitable enclosure or bead of plastic insulating material. Preferably the material is thermosetting and may, for example, consist of bioplastic which is a methacrylate or of araldite to embed or bond crystal 30 and wire ends 20, 21. The insulating enclosure 35 now supports the wire ends 20, 21 and maintains the predetermined spacing between them and the desired contact pressure between the wire ends 20, 21 and the crystal 30.

Figure 7:
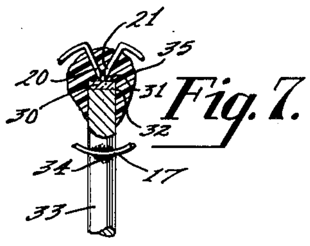

The final step in the manufacture is to sever the intermediate loop portions 36, 37 as shown in Figure 7. Electrical contact may now be made to the support wire 33 representing the base electrode and to the wires 20, 21 which form the emitter and collector electrodes. The transistor of the invention is now ready for use or may be electrically formed as is well known to the art.

In order to provide for more intimate contact between the wires 20, 21 and the insulating material 35, it is feasible to serrate the wire 16.

There has thus been disclosed an improved tansistor of simplified construction which is particularly adapted for mass production. It has been found that the transistor of the invention is very stable mechanically.

What is claimed is:

1. The process of preparing a plurality of wire loops, each being adapted to be used as the emitter and collector electrodes of a transistor, said process comprising the steps of winding a metallic wire spirally on a cylindrical mandrel having a wedge-shaped recess, thus providing a continuous wire spiral, and inserting a wedge having a knife edge into the recess of the mandrel to sever simultaneously each individual loop of the wire spiral and to shape the free ends of each loop to provide a pair of substantially straight leg portions.

2. The process of preparing a plurality of wire loops, each being adapted to be used as the emitter and collector electrodes of a transistor, said process comprising the steps of winding a metallic wire spirally on a cylindrical mandrel having a wedge shaped recess, thus providing a continuous wire spiral, inserting a wedge having a knife edge into the recess of the mandrel to sever simultaneously each individual loop of the wire spiral and to shape the free ends of each loop to provide a pair of substantially straight leg portions, and pointing the free ends of each of said wire loops.

References Cited in the file of this patent

UNITED STATES PATENTS

| | | |
|---|---|---|
| 2,156,660 | Van Geel | May 2, 1939 |
| 2,406,405 | Salisbury | Aug. 27, 1946 |
| 2,472,938 | Brittain et al. | June 14, 1949 |
| 2,561,109 | Giacoletto | July 17, 1951 |
| 2,586,609 | Burke | Feb. 19, 1952 |
| 2,606,960 | Little | Aug. 12, 1952 |
| 2,627,545 | Muss et al. | Feb. 3, 1953 |